United States Patent
Popov

(10) Patent No.: US 6,747,263 B1
(45) Date of Patent: Jun. 8, 2004

(54) MATRIX OUTPUT DEVICE READOUT SYSTEM

(75) Inventor: Vladimir Popov, Newport News, VA (US)

(73) Assignee: Southeastern University Research Assn. Inc., Newport News, VA (US)

( * ) Notice: Subject to any disclaimer, the term of this patent is extended or adjusted under 35 U.S.C. 154(b) by 395 days.

(21) Appl. No.: 10/006,494

(22) Filed: Dec. 7, 2001

(51) Int. Cl.$^7$ .............................................. H01J 40/14
(52) U.S. Cl. ................................ 250/214 VT; 250/207
(58) Field of Search .......................... 250/214 VT, 207; 313/103 CM, 535

(56) References Cited

U.S. PATENT DOCUMENTS

| | | | | |
|---|---|---|---|---|
| 4,070,578 A | * | 1/1978 | Timothy et al. | 250/336.1 |
| 4,622,467 A | * | 11/1986 | Britten et al. | 250/389 |
| 4,769,527 A | * | 9/1988 | Hart et al. | 347/210 |
| 5,880,457 A | * | 3/1999 | Tomiyama et al. | 250/207 |

* cited by examiner

Primary Examiner—David Porta
Assistant Examiner—Patrick J. Lee

(57) ABSTRACT

A system for providing high-resolution display for a matrix output device, such as a Photo-Multiplier Tube (PMT) matrix, that requires a substantially less number of amplifiers than prior readout systems. A resistor matrix is coupled directly to the outputs of a matrix output device. The outputs in each row in the matrix are combined and amplified with an amplifier that is at an end of each row. Similarly, the outputs in each column of the matrix are combined and amplified with an amplifier at an end of each column. The amplifiers at the end of each row and column also provide conversion of the signals from a current to a voltage. The converted and amplified signals are then processed, using a simple yet accurate algorithm such as center of gravity interpolation, to determine location and other information. The determined information may relate to detection of photons on the PMTs, for example, and is provided as an output signal from the processing circuitry. The output signal from the processing circuitry can be sent to a display device such as a video monitor for display and further analysis of the determined information. The present imaging readout system provides substantial savings in the cost of production and operation of PMT systems, which typically have thousands of outputs requiring amplification for readout.

12 Claims, 3 Drawing Sheets

MATRIX OUTPUT DEVICE READOUT SYSTEM

BACKGROUND OF THE INVENTION

The present invention relates generally to matrix output devices, and more specifically to a readout system for a matrix output device, that requires substantially less amplifiers than traditional readout systems.

A Position Sensitive Photo-Multiplier Tube (PSPMT) is a photosensitive matrix output device that converts light photons into electrical currents. The main components of a PSPMT are an input window, a photocathode, focusing electrodes, dynodes and an anode. The photocathode is used for converting incoming light (photons) into electrons. These photoelectrons, which are a product of the photoelectric effect, are directed by the potential of focusing electrodes towards dynode stages. The dynodes are used to multiply the electrons by the process of secondary electron emission. Electron gains of $10^3$ to $10^8$ are common and depend on the number of dynode stages and interdynode potentials of the PSPMT.

The voltages that create the electrostatic fields between the photocathode, the focusing electrodes and the dynodes are delivered from a single high-voltage stable power supply and a voltage divider. The divider is a common part of a PMT base. The design of the divider circuit is crucial to getting the best performance from PMT. Series-regulator type high voltage power supplies optimized for photomultiplier tubes are well known in the art. Other components found in or required by scintillation cameras are described in "Photomultiplier Tube, Principle to Application" by Hamamatsu Photonics K. K., March 1994, which is incorporated herein by reference.

The output of a photomultiplier tube is a current, while the external signal processing circuits are usually designed to handle a voltage signal. Therefore, the current output must be converted into a voltage signal by a current to voltage converter. Further, the current that is output from a PMT anode is very small, especially in low light level detection and photon counting applications. An operational amplifier can be used to both convert the anode output current to a voltage and accurately amplify the resulting voltage. Typically this operational amplifier is powered by a source that is separate from the high voltage power source for the dynode stages of the PMT. This is done to insure the stability of the power supply to the dynodes. The voltage supplied to each dynode stage must be extremely stable or the PMT output will be adversely affected.

Typically, a PMT provides reliable, stable gain for some hundreds or thousands of hours, then its stability decreases as a function of the total charge handled. The decreased stability is primarily a result of dynode degradation. The dynode stages of a PMT are worn down more quickly when higher voltages, higher gain and higher anode currents are used. The use of very high voltages across the dynode stages provides a PMT output that may not need amplification. However, this leads to frequent replacement of the PMT's.

The present system provides accurate, inexpensive readout of the output signals of matrix output devices, such as Position Sensitive Photo-Multiplier Tubes (PSPMT). The system provides a reduction in the number of output channels without a loss of position information. PSPMT's are used in many imaging devices that are in use and under development the medical field and other commercial applications.

PSPMT's such as Phillips 1702, 1722 and 1752, traditionally require a 64-channel readout. The present system provides a significant reduction of the number of analog electronic channels necessary for complete X and Y coordinate information readout. The channel reduction for the above mentioned PSPMT's is from 64 down to only 16 required analog outputs. By reducing the number of channels that need to be read, the entire read out system can be significantly simplified. This will lead to reduced cost and smaller packaging. A reduction in size is particularly important in applications such as inter-operative probes, where smaller devices have greater utility. The present read out system provides cost and size savings without any loss in information integrity.

The present system provides separate X and Y coordinates from the PSPMTs and can use several different methods such as, charge division based signal processing, center of gravity interpolation and delay line readout to determine location and other information. In the preferred embodiment, center of gravity interpolation is used. The system includes the small amount of hardware required to execute the center of gravity calculations. Preferably, analog hardware is used. However, digital circuitry may easily be substituted to perform the center of gravity calculations.

The present readout system includes a resistor matrix connected directly to the PSPMTs matrix outputs. Matrix output devices can be described as having X number of rows and Y number of columns. Each row and column may contain 32, 64 or more PMT outputs. However in the present system, only one output is analyzed for each row and one for each column. The PSPMT outputs are currents that require termination with low impedance amplifiers. The present resistor matrix is connected directly to the low impedance amplifiers. Output signals from each resistor in the matrix are sent along X and Y signal paths that terminate at an end of each of the rows and columns. These row and column signals are the only output signals that are further processed in the present system to determine location/coordinate information. The X and Y output signals are processed using center of gravity interpolation to determine the X to Y separation, in the preferred embodiment. Each resistor of the resistor matrix is of the same value and the ratio of the resistors value to the input amplifiers impedance value are used to determine coordinate information from the PSPMT outputs.

In the preferred embodiment, center of gravity interpolation is used to convert 2-D coordinate PSPMT outputs into X and Y outputs via a directly coupled resistor matrix. In alternative embodiments, different coordinate determination methods are used such as, charge division and delay line readout. In the charge division embodiment, the amplifier output signals are connected as independent X and Y outputs to resistor chains. In the delay line readout embodiment, the amplifier output signals are connected to a delay line. In all embodiments the resistor values are set according to the application. Further, analog data processing circuitry is preferred however, can be replaced by digital processing circuitry.

SUMMARY OF THE INVENTION

The present system provides high-resolution display for a matrix output device, such as a Photo-Multiplier Tube (PMT) matrix$_1$ with a substantially less number of amplifiers than prior readout systems. In a typical example, the present readout system can replace a traditional system that requires 64 amplifiers with a system that requires only 16 amplifiers.

And the present 16-amplifier system delivers the same or better resolution as the traditional readout system. A resistor matrix is coupled directly to the outputs of a matrix output device. The outputs in each row in the matrix are combined and amplified with an amplifier that is at one end of each row. Similarly, the outputs in each column of the matrix are combined and amplified with an amplifier at one end of each column. The amplifiers at the end of each row and column also provide conversion of the signals from a current to a voltage. The converted and amplified signals are then processed, using a simple yet accurate algorithm such as center of gravity interpolation, to determine location and other information. The determined information may relate to detection of photons on the PMTs, for example, and is provided as an output signal from the processing circuitry. The output signal from the processing circuitry can be sent to a display device such as a video monitor for display and further analysis of the determined information. The present imaging readout system provides substantial savings in the cost of production and operation of PMT systems, which typically have thousands of outputs requiring amplification for readout.

BRIEF DESCRIPTION OF THE DRAWINGS

The invention of the present application will now be described in more detail with reference to the preferred embodiment of the method and apparatus, given only by way of example, and with reference to the accompanying drawings, in which.

DETAILED DESCRIPTION OF THE INVENTION

An electronic system is used to read the output signals of matrix output devices, such as Position Sensitive Photo-Multiplier Tubes (PSPMT). The system provides a reduction in the number of output channels without a loss of position information. The present system provides separate X and Y coordinates from the PSPMTs and can use several different methods to determine location and other information such as, charge division based signal processing, center of gravity interpolation and delay line readout. In the preferred embodiment, center of gravity interpolation is used. The system includes the small amount of hardware required to execute the center of gravity calculations. Preferably, analog hardware is used. However, digital circuitry may easily be substituted to perform the center of gravity calculations.

The present readout system includes a resistor matrix connected directly to the PSPMTs matrix outputs. Matrix output devices can be described as having X number of rows and Y number of columns. Each row and column may contain 32, 64 or more PMT outputs. However in the present system, only one output is analyzed for each row and one for each column. The PSPMT outputs are currents that require termination with low impedance amplifiers. The present resistor matrix is connected directly to the low impedance amplifiers. Output signals from each resistor in the matrix are sent along X and Y signal paths that terminate at an end of each of the rows and columns. These row and column signals are the only output signals that are further processed in the present system to determine location/coordinate information. The X and Y output signals are processed using center of gravity interpolation to determine the X to Y separation, in the preferred embodiment. Each resistor of the resistor matrix is of the same value and the ratio of the resistors value to the input amplifiers impedance value are used to determine coordinate information from the PSPMT outputs.

In the preferred embodiment center of gravity interpolation is used to convert 2-D coordinate PSPMT outputs into X and Y outputs via a directly coupled resistor matrix. In alternative embodiments, different coordinate determination methods are used such as, charge division and delay line readout. In the charge division embodiment, the amplifier output signals are connected as independent X and Y outputs to resistor chains. In the delay line readout embodiment, the amplifier output signals are connected to a delay line. In all embodiments the resistor values are set according to the application. Further, analog data processing circuitry is preferred however, can be replaced by digital processing circuitry.

Figure 1:
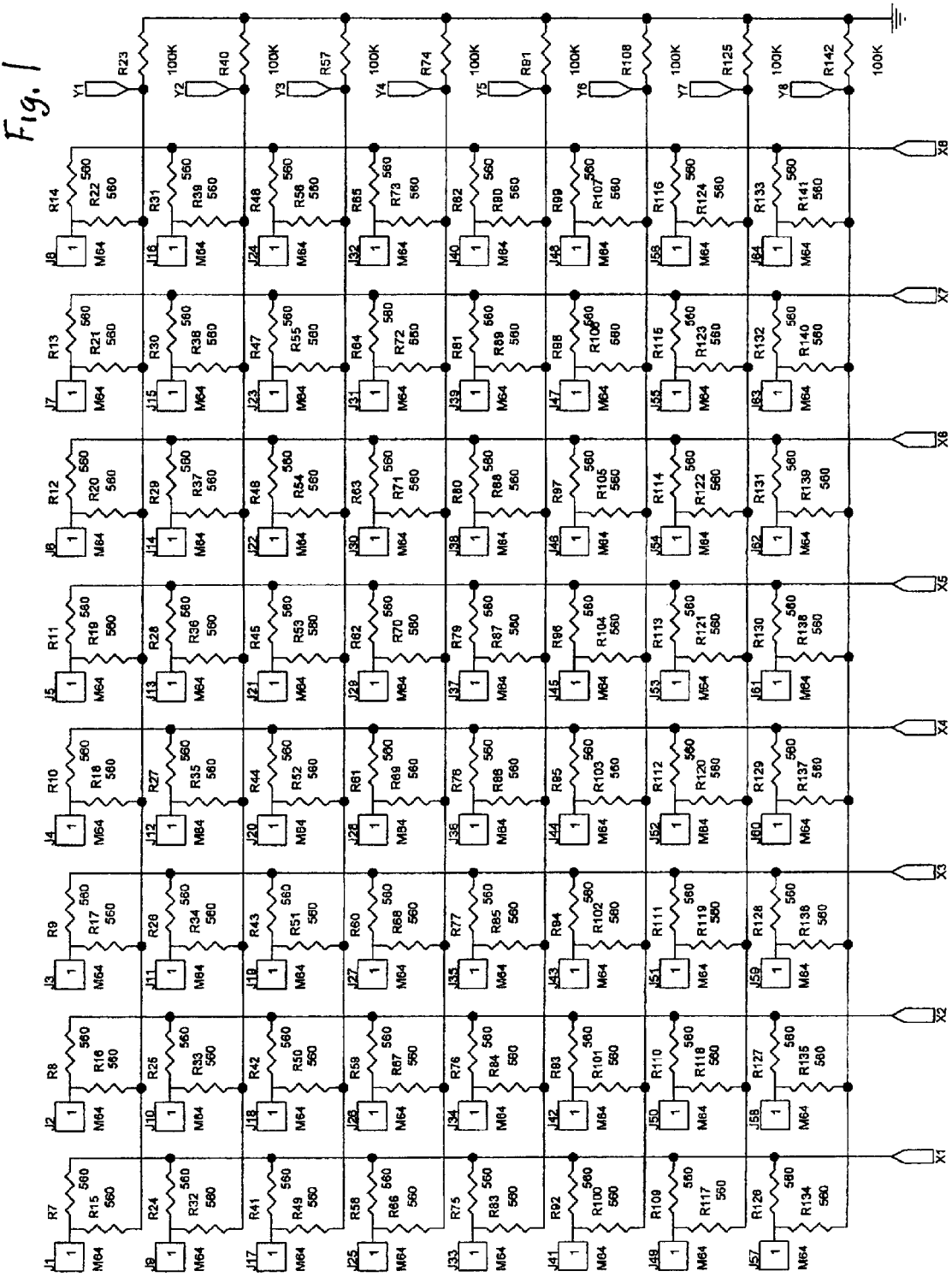
FIG. 1 is an exemplary resistor matrix of the present conversion and readout system.

FIG. 1 provides an example of the present resistor matrix. In FIG. 1, eight rows and eight columns are shown. At the end of each row and each column is a low impedance amplifier that converts and amplifies the output current into a voltage before the signal is sent to center of gravity processing circuitry, in the preferred embodiment. The eight rows and eight columns form sixty-four intersections. Each intersection has two resistors electrically connected to each output from a matrix output device, such as PSPMTs. Each output from the matrix output device becomes an input for the present conversion and readout system. When a PSPMT is the matrix output device, the resistor matrix is coupled directly to each anode output from the PSPMT. The electrical signals pass through the resistors of the present resistor matrix and then travel down X and Y paths to the low impedance amplifiers at the end of each row and each column. In the example of FIG. 1, there are eight rows each with one amplifier and eight columns each with another amplifier, for a total requirement of 8+8, or 16 amplifiers for the present system. Traditional conversion and readout systems would require 8×8, or 64 amplifiers for the same matrix output device.

This present system also reduces the complexity of traditional coordinate determination signal processing required. In the preferred embodiment, a simple center of gravity interpolation algorithm is used that requires only a small amount of processing circuitry. Although simple, this algorithm provides accurate resolution of received electrical signals. In the example of FIG. 1, the output pads of the matrix output device are 2.5 mm apart from each other. In the preferred embodiment, the present system provides accurate resolution to the order of a fraction of a millimeter (mm), much better than the actual 2.5 mm separation of the output pads.

Figure 2:
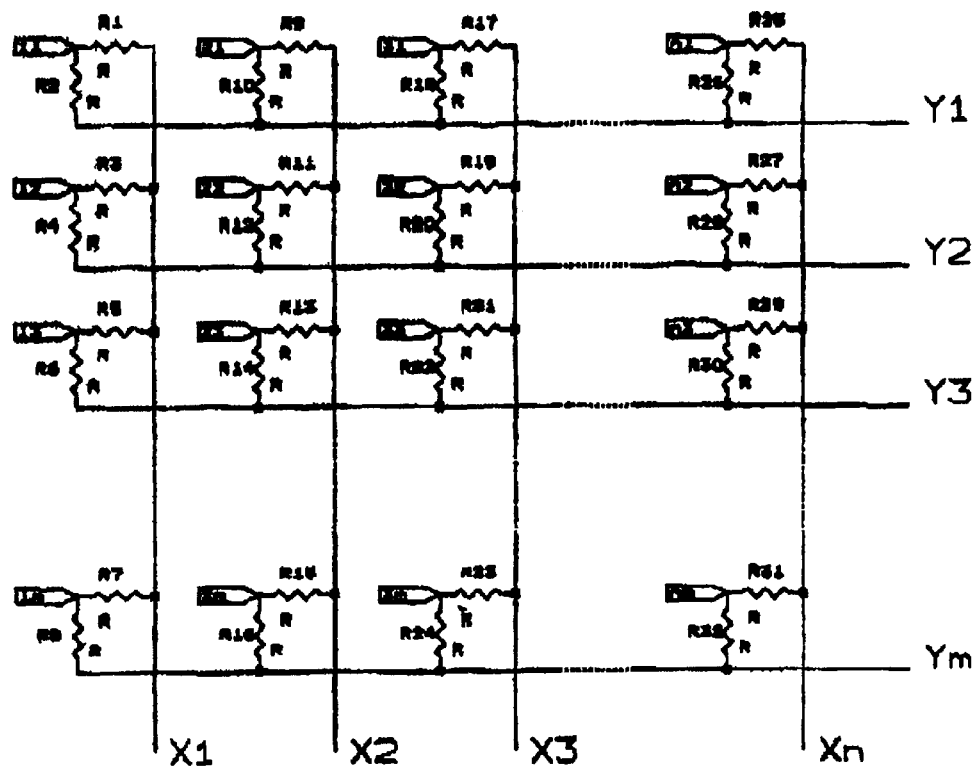
FIG. 2 is a schematic for a resistor matrix of the present conversion and readout system.

FIG. 2 illustrates that the present system is not limited to eight by eight matrices. The number of rows and columns can go up to any numbers m and n, respectively, as shown in FIG. 2. Again, two resistors are provided at each intersection of the resistor matrix, and each resistor is electrically connected to an output of the matrix output device. Alternative matrices include: 16×16; 32×32; and 64×64, for example. In a traditional conversion and readout system, a 16×16 output matrix requires 256 amplifiers. In the present conversion and readout system, a 16×16 output matrix requires only 32 amplifiers. Similarly, a traditional system requires 4096 amplifiers for a 64×64 output matrix. While the present system requires only 128 amplifiers for a 64×64 output matrix. The amplifiers may comprise any suitable component or components for amplifying and converting the output signals, such as a one stage or multistage transistor and/or resistor circuit, for example.

Figure 3:
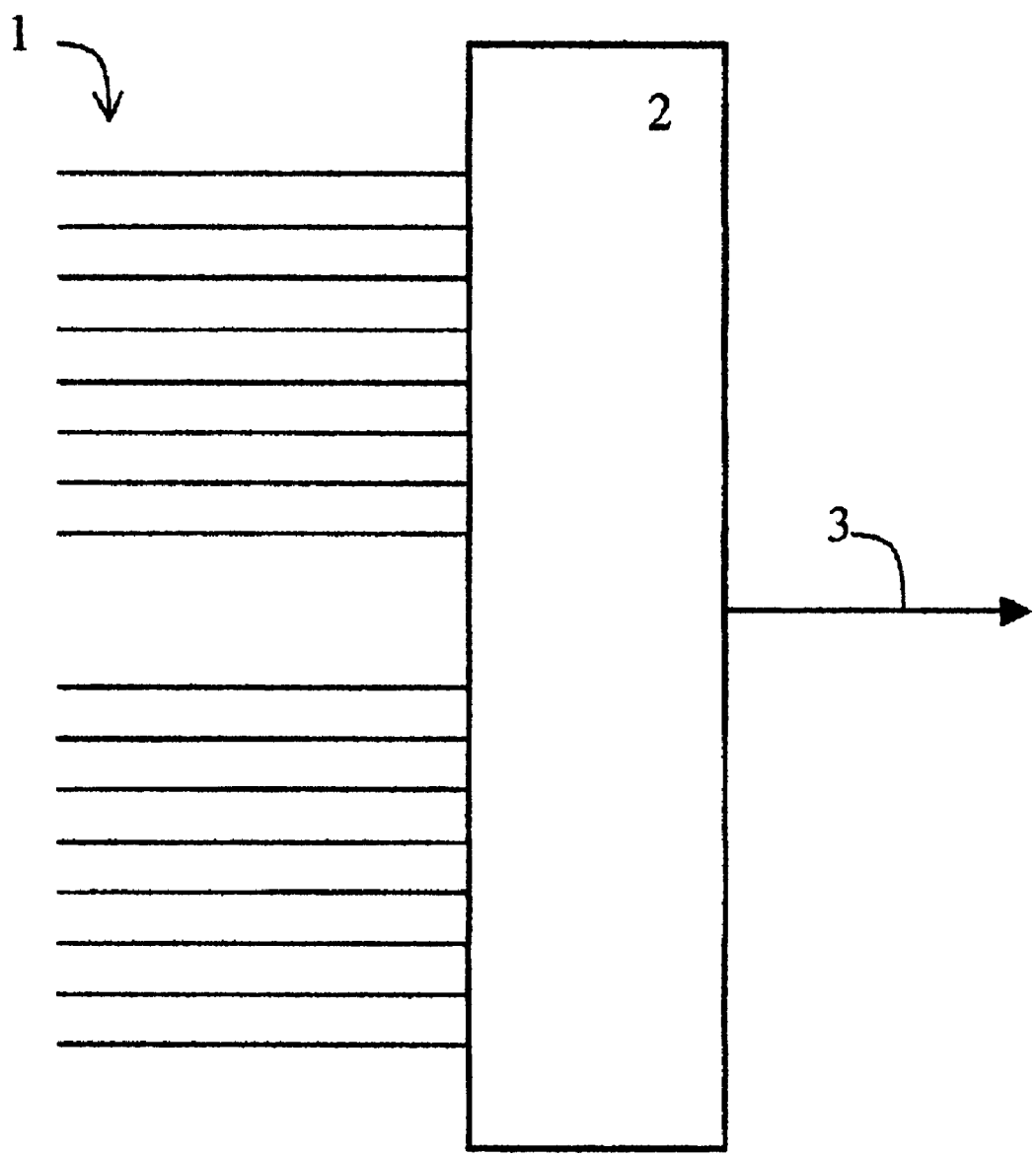
FIG. 3 illustrates the processing circuitry that is connected to a resistor matrix.

In FIG. 3, sixteen amplified and converted signals 1 are received by processing circuitry 2. One signal is received from each of the eight rows and eight columns of the resistor matrix of FIG. 1. In the preferred embodiment, processing circuitry 2 uses analog circuitry to execute the center of gravity method of location and other information determination. Processing circuitry output signal 3 is sent to a display device for visual display of the results. The analog processing circuitry may be replaced with digital processing circuitry in alternative embodiments. Further, the center of gravity information determination algorithm may replaced with other information determination methods such as charge division readout and delay line readout.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A readout system for a matrix output device, comprising:
    a resistor matrix that is coupled directly to outputs of the matrix output device wherein the resistor matrix comprises resistors and electrical paths that match rows and columns of the matrix output device;
    a first set of amplifiers, wherein one amplifier is attached to an end of each row of the resistor matrix;
    a second set of amplifiers, wherein one amplifier is attached to an end of each column of the resistor matrix;
    processing circuitry that processes signals received from the first and second set of amplifiers attached to the resistor matrix;
    electrical paths that connect each amplifier to the processing circuitry;
    an output signal from the processing circuitry that can be displayed on a display device, wherein the output signal comprises location and other information regarding signals received from the matrix output device.

2. The readout system of claim 1 wherein, the matrix output device is a Position Sensitive Photo-Multiplier Tube (PSPMT) matrix, and the resistors of the resistor matrix are coupled directly to anodes of the PSPMTs.

3. The readout system of claim 1 wherein, the processing circuitry is analog or digital.

4. The readout system of claim 1 wherein, the processing circuitry executes one of the following information determination algorithms: center of gravity interpolation; charge division readout; or delay line readout.

5. The readout system of claim 1 wherein, the outputs from the matrix output device are spaced 2.5 mm apart from each other, and the resolution provided by the output signal of the processing circuitry is better than 0.5 mm.

6. The readout system of claim 1 wherein, the matrix output device has 256 outputs and the resistor matrix 16 amplifiers.

7. A method for reading out the information provided by a matrix output device, comprising the steps of:
    coupling a resistor matrix directly to outputs of the matrix output device wherein the resistor matrix comprises resistors and electrical paths that match rows and columns of the matrix output device;
    amplifying a row signal from each row of the resistor matrix wherein, the row signal is a combination of all signals received in a particular row of the resistor matrix;
    amplifying a column signal from each column of the resistor matrix wherein, the column signal is a combination of all signals received in a particular column of the resistor matrix;
    transmitting the row and column signals to processing circuitry that processes the signals in order to determine location and other information that is received from the matrix output device;
    providing electrical paths that connect the resistor matrix to the processing circuitry;
    outputting an output signal from the processing circuitry that can be displayed on a display device, wherein the output signal provides location and other information received from the matrix output device.

8. The method of claim 7 wherein the step of transmitting further comprises processing the signals with analog or digital processing circuitry.

9. The method of claim 7 further comprising the step of:
    using one of the following algorithms in processing the signals: center of gravity interpolation; charge division readout; or delay line readout.

10. The method of claim 7 further comprising the step of:
    displaying the processing results with a resolution better than 0.5 mm, wherein the outputs of the matrix output device are spaced 2.5 mm apart.

11. The method of claim 7 wherein the step of coupling further comprises with 16 amplifiers to a matrix output device with 256 outputs.

12. The method of claim 7 wherein, the matrix output device is a Position Sensitive Photo-Multiplier Tube (PSPMT) matrix.

* * * * *